Nov. 15, 1949  G. E. KING ET AL  2,488,413
VARIABLE-VOLTAGE CONTROL SYSTEM
Filed July 17, 1947

WITNESSES:

INVENTORS
George E. King and
Martin H. Fisher.
BY
ATTORNEY

Patented Nov. 15, 1949

2,488,413

UNITED STATES PATENT OFFICE 2,488,413

VARIABLE-VOLTAGE CONTROL SYSTEM

George E. King, Edgewood, and Martin H. Fisher, Pittsburgh, Pa., assignors to Westinghouse Electric Corporation, East Pitsburgh, Pa., a corporation of Pennsylvania Application July 17, 1947, Serial No. 761,555

12 Claims. (Cl. 318—143)

Our invention relates to variable-voltage systems generally of the Ward Leonard type and, in one of its main aspects, concerns itself with reverisble variable-voltage drives for fabricating machines, such as planers and similar machine tools.

It is an object of the invention to provide a variable-voltage system which affords an extremely quick response to control signals or actions that call for an immediate disappearance or reversal of the controlled load voltage.

Relative to electric drives for reciprocable machinery, such as planers and the like machine tools, it is also an object of the invention to permit a substantial increase in operating speed and efficiency without loss in accuracy or protection from tool overtravel, especially when operating with short strokes.

With reference to the latter object, it is known that the operating speed and efficiency of a planer, for instance, is limited by the fact that, although the electric drive may be rated for operation at high speeds, the working speed cannot safely be increased beyond a value at which the travel of the tool or work piece, during the reversing interval at the end of the working strokes, becomes too long or indefinite to guarantee an accurate performance. For example, if the speed is too high, the tool at the end of the cut stroke and when cutting toward a shoulder on the work piece, may run into the material of the work piece and thus cause damage to the work piece, tool, or machine structure. The speed limitation thus imposed by the working conditions is especially noticeable when operating with short strokes. More specifically, therefore, it is an object of our invention to devise a variable-voltage system that secures a highly increased speed and accuracy of the reversing and stop control means and thereby permits increasing the overall speed of performance and efficiency as expressed, for instance, by an increased number of permissible short strokes per minute.

Figure 1:
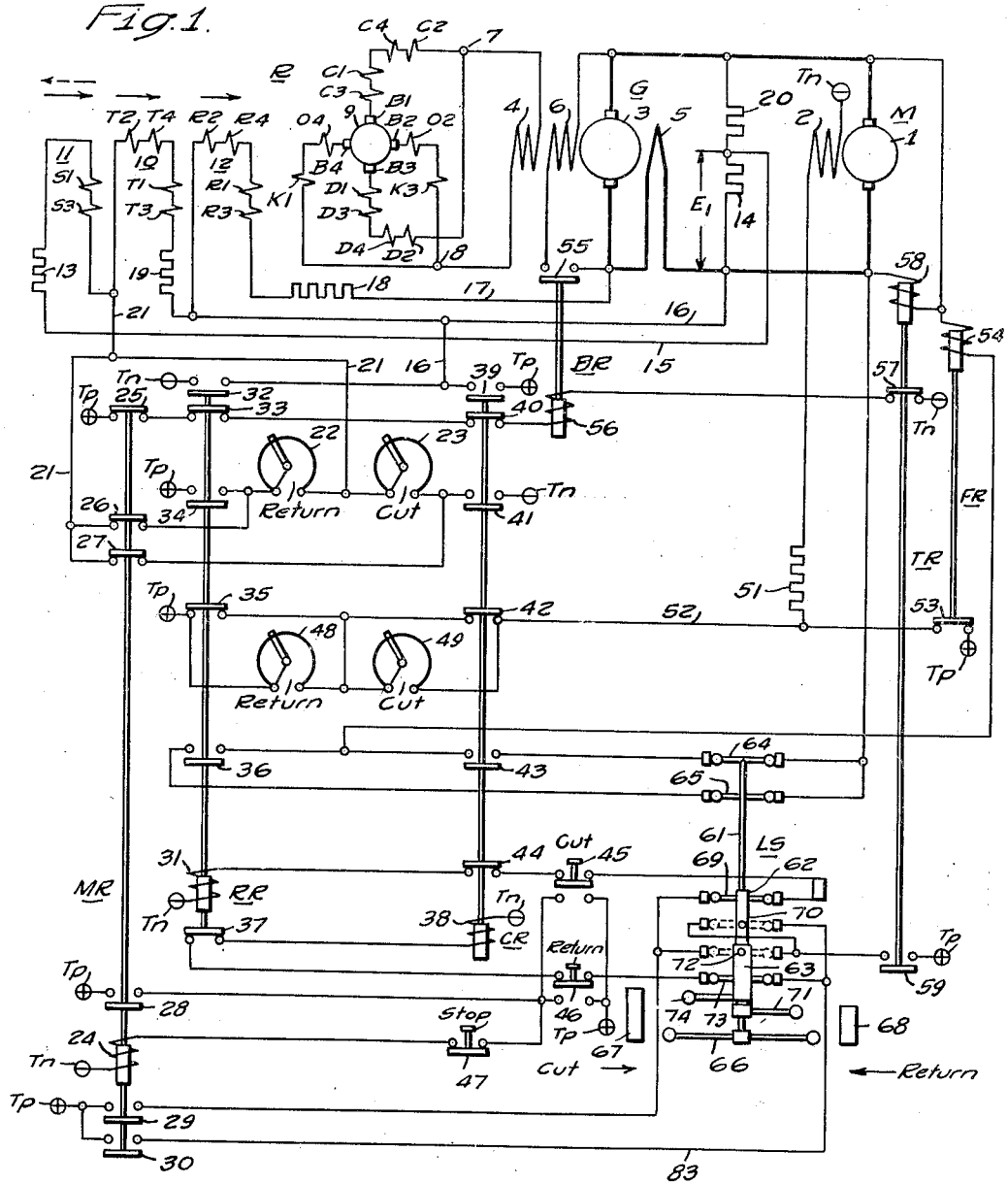
Figure 2:
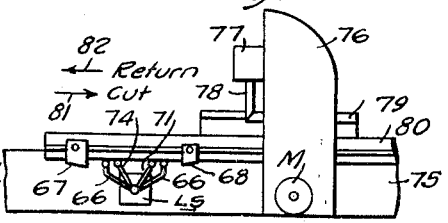

In order to achieve these objects as well as those apparent from the following description, our invention provides means whose essential features are defined in the claims annexed hereto and will be understood from the following explanations relating to the embodiment exemplified by the drawing, in which Figure 1 illustrates the circuit diagram of a variable-voltage system for controlling a motor to drive a reciprocating structure of a machine tool or other fabricating machinery; and Fig. 2 shows schematically a planer for which the control system may be applied.

According to Fig. 1, the reversible drive motor M of the machinery to be controlled has its armature 1 energized by variable-voltage from a main generator G, while the motor field winding 2 is separately excited. The main generator G has its armature 3 acted upon by a separately excited main field winding 4, a series field winding 5, which may represent the compensating or interpole windings of the generator, and an auxiliary suicide field winding 6. The main field winding 4 of generator G receives excitation of variable voltage from the output terminals 7 and 8 of a regulating generator R, whose armature is denoted by 9. The regulating generator is equipped with three groups of separately excited field windings denoted as a whole by 10, 11 and 12, respectively.

While we have shown a particular type of regulating generator, to be described below, it should be understood that the invention, as regards some of its features can be realized with the aid of various other regulating or amplifying generators. For instance, generators whose main field excitation is produced by armature reaction are applicable, as well as generators in which an amplification is produced by a tuned self-energizing field circuit whose resistance line substantially coincides with the unsaturated linear portion of the magnetic operating characteristic of the machine. In the embodiment illustrated in the drawing, we provide a regulating generator R which operates as a double-stage amplifier and is designed in accordance with our copending application, Serial No. 761,556; and we wish it to be understood that the illustrated generator may readily be replaced by any one of the other modifications of amplifying plural-stage generators referred to in that application or in the related copending applications, Serial No. 607,440, now Patent No. 2,484,835, issued October 18, 1949, Serial No. 682,188, now Patent 2,484,840, issued October 18, 1949, Serial No. 696,571 and Serial No. 685,109, now Patent 2,445,788, issued July 27, 1948.

The regulating generator R, as exemplified in Fig. 1, is a four-pole machine whose armature 9 is equipped with a lap-wound winding as customary for conventional four-pole generators. Main field excitation is provided by forcing coils C1 and D1 on one field pole of the machine, forcing coils C2 and D2 on the second pole, forcing coils C3 and D3 on the third pole, and forcing coils C4 and D4 on the fourth pole of the machine. These forcing coils are all series connected between two equipolar (for instance, negative) commutator brushes B1 and B3. The two other equipolar (i. e., positive) brushes B2 and B4 are cross-connected by a circuit which includes opposition coils O2 and O4 on the second and fourth poles of the field structure, and compensating coils K1 and K3 on the first and third poles. The coils C1 and D1 have equal turns and act cumulatively as regards the internal circulating current flowing between brushes B1 and B3 but differentially relative to the external load current flowing between the output terminals 7 and 8. Consequently, the output current has no effect on the excitation of the forcing coils, and this excitation is controlled only by the separate excitation applied to the field winding groups 10, 11 and 12 in the manner described below.

The separately excited field winding group 10 is composed of "pattern field coils" T1, T2, T3 and T4 which are located on the respective four poles of the field structure. These coils have equal turns so that their excitation has the effect of producing a symmetrical and balanced magnetic flux through the four-pole field structure and armature of the machine. The field winding group 12 is composed of four "IR-drop coils" R1, R2, R3 and R4 which are located on the four field poles, respectively, and have equal turns in order to also produce a flux of symmetrical and balanced distribution. The winding group 11 has two "signal field coils" S1 and S3 which are located only on the first and third pole of the machine. Assuming that the above-mentioned forcing coils and the coils of groups 10 and 12, under a given operating condition, cause the first and third poles to assume north polarity while the second and fourth poles assume south polarity, then the excitation of the signal field coils S1 and S2 has the effect of strengthening one of the north poles while weakening the other north pole so that the equipolar (negative) brushes B1 and B3 assume different potentials. As a result, an equalizing current circulates between the brushes B1 and B3. Since this current passes through the above-mentioned forcing coils and magnetizes all four field poles of the machine, it causes an amplified voltage to be generated between the two brush pairs; and this amplified voltage is effective across the output terminals 7 and 8.

It will be recognized from the foregoing that the regulating generator has two amplifying stages. The first stage is input-excited by the signal coils S1 and S3, and its amplified output voltage appears across brushes B1 and B3. The second amplifying stage of the generator is input-excited by the forcing coils connected between the brushes B1 and B3, and its output voltage appears across the terminals 7 and 8. The input stage can be analyzed to represent a two-pole "machine." The second stage represents a four-pole "machine" which is superimposed on the two-pole "machine." The proper performance of the generator requires that it be operated substantially only within the unsaturated and substantially linear portion of its magnetic characteristic.

The desired amplifying performance is accompanied by an armature reaction which produces a magnetic flux in opposition to that induced by the signal field coils S1 and S2, and hence, tends to weaken the control effect of these coils. This detrimental reaction, however, is reduced and compensated by the above-mentioned coils O2, O4, K1 and K3. Details concerning the rating and functioning of such auxiliary coils are disclosed in the above-mentioned copending applications Serial No. 607,188, now abandoned, and Serial No. 682,188 and are not essential to the present invention proper so that a further description is unnecessary. It may be mentioned, however, that the two coils of each respective pair O2, O4 and K1, K3, act cumulatively under internal circulating current but balance each other relative to the external load current so that the field effect of the auxiliary coils is due only to internal circulating current and not affected by changes in load current.

The signal coils 11 are series-connected with a calibrating resistor 13. A resistor 14 is connected across the motor armature 1 in series with a resistor 20. Resistor 14 is series-arranged in the circuit of the signal coils and impresses on that field circuit a component signal voltage which is equal to the voltage drop $E_1$ across the resistor 14 and proportional to the terminal voltage of the motor M. The circuit of signal field coils 11 includes also a source of another component signal voltage so that the excitation of coils 11 depends upon the resultant and normally differential effect of the two component signal voltages. This will be further explained in a later place.

The IR-drop coils 12 are connected across the generator series field 5 through leads 16 and 17 in series with a calibrating resistor 18. The voltage drop across field winding 5, and hence the excitation of coils 12, is proportional to the IR drop in the motor armature circuit.

The pattern field coils 10 are series connected with a calibrating resistor 19 across the above-mentioned lead 16 and a lead 21. Lead 21 connects the pattern field circuit with two rheostats 22 and 23. Rheostat 23 serves to adjust the motor speed for the cut or forward stroke, while rheostat 22 permits adjusting the motor speed for the return stroke.

The system is equipped with a main relay MR, a cut relay CR, a return relay RR, a brake relay BR, a field relay FR and a timing relay TR. The coil circuits of these relays, as well as the above-mentioned pattern field circuit and signal field circuit, receive excitation from constant voltage buses or terminals which, for the purpose of a simplified illustration, are separately represented by terminals marked $Tp$ and $Tn$. It should be understood that all terminals $Tp$ may represent a single positive bus, and all terminals $Tn$ a single negative bus energized from a suitable source of constant direct-current voltage. This source may consist preferably of an exciter generator (not illustrated) which is driven at constant speed together with the armature 3 of generator G and the armature 9 of generator R.

The control coil 24 of main relay MR actuates six contacts denoted by 25 through 30, respectively. Coil 31 of return relay RR actuates five contacts denoted by 32 through 37, respectively. Coil 38 of cut relay CR operates six contacts 39 through 44, respectively. The circuit for coil 21 in relay RR includes a cut control contact 45, for instance of the push-button type, which is biased to normally assume the illustrated position. The circuit for coil 38 of cut relay CR includes a return control contact 46, preferably also of the push-button type, which is biased to normally assume the illustrated position. The circuit of coil 24 in main relay MR includes a normally closed stop control contact 47.

The energizing circuit for the motor field winding 2 includes two adjustable rheostats 48 and 49 and a field resistor 51. Resistor 51 is connected to the rheostat 49 by a lead 52, and under certain operating conditions is directly connected to a positive terminal $Tp$ through a contact 53 of the field relay FR, whose coil 54 is energized under control by relays RR and CR by the voltage obtaining across the motor armature 1.

The suicide field winding 6 of generator G is connected across the generator armature 3 only when the contact 55 of brake relay BR is closed due to energization of the appertaining relay coil

56. The circuit of coil 56 is controlled by a contact 57 of relay TR, whose control coil 58 is connected across the motor armature 1 and actuates also a contact 59.

A limit switch assembly, as a whole, is denoted by LS. This assembly may consist of a group of individual electric contacts which are properly arranged relative to the path of motion of the driven machine member to perform their respective operations when the member reaches predetermined positions of travel. The particular limit switch arrangement shown in the drawing has been chosen for illustration merely because it permits a readily understandable representation within a single plane of illustration. We wish to emphasize, however, that the design of these switch means may be modified in many various ways and that it is not essential to the invention proper, which particular design is selected.

As shown in Fig. 1, the limit switch assembly LS has three coaxial members 61, 62 and 63 which are revolvable independently of one another about a common axis and are biased to assume the illustrated positions, unless actuated in the manner described in the following. The member 61 is provided with two normally closed contacts 64 and 65, and is actuated by a lever 66 which has two arms projecting into the path of travel of a cut limit dog 67 and a return limit dog 68. The member 62 has a normally closed contact 69 and a normally open contact 70 actuated by a stop control lever 71 which projects into the path of the return dog 68 and is actuated only after this dog has previously actuated the lever 66. The member 63 has a normally open contact 72 and a normally closed contact 73 and is actuated by a stop control lever 74 to be engaged and operated by the dog 67 after the lever 66 has previously been actuated during a cut stroke.

The arrangement of the just-mentioned control dogs and levers on the machinery to be controlled is apparent from Fig. 2. In Fig. 2, the bed structure of a planer to be operated by the reversible drive motor M is denoted by 75 and the appertaining super-structure by 76. A cross rail 77 is vertically displaceable along the structure 76 and carries the planing tool 78 to operate on a workpiece 79 mounted on a reciprocable table 80. The two dogs 67 and 68 are individually adjustable to any desired relative position along the reciprocating table 80. The cut direction is denoted by an arrow 81 and the return direction by an arrow 82. It will be recognized that when the table moves in the cut direction, the dog 67 will first engage the lever 66, thus opening the two contacts 64 and 65 (Fig. 1) and will thereafter engage the stop control lever 74 (Fig. 2) and then close the contact 72 while opening the contact 73 (Fig. 1). When the movement of table 80 reverses, the levers 66 and 74 move back into the illustrated position and remain there during almost the entire return period until the dog 68 engages the lever 66 and again opens the contacts 64 and 65 and thereafter actuates the stop control lever 71 to close contact 70 and open contact 69 during the temporary period of engagement.

The system, as a whole, operates as follows:

Let us assume that the terminals Tp and Tn are energized by proper voltage and that the armatures 3 and 9 of respective generators G and R are driven at proper speed, while all relays and contacts are in the illustrated position, with the exception of the brake relay BR whose coil 56 is then energized from terminals Tp and Tn through the closed contacts 25, 33, 40 and 57, so that the suicide field winding 6 is connected across generator armature 3 by contact 55. Under these conditions, the field winding 2 of motor M is energized through contact 53 and resistor 51. The circuit of the pattern field windings 10 is interrupted at contacts 32 and 39 so that this circuit receives no excitation. The signal field coils 11 are not excited. Since no current flows in the main armature circuit, the IR-drop coils 12 are also deenergized. The forcing coils between brushes B1 and B3 of regulating generator R receive no excitation because, as explained above, their excitation depends on that of the signal coils 11. Consequently, the excitation of the main generator field winding 4 is zero, and the voltage of generator G is zero, and motor M is at rest.

If now the cut contact 45 is temporarily depressed by the operator, main relay MR picks up because its coil 24 becomes energized in the circuit $$Tp\text{---}45\text{---}47\text{---}24\text{---}Tn \qquad (1)$$

Thereafter, relay MR holds itself in because a self-sealing circuit for its coil 24 is closed at contact 28. Cut relay CR picks up since its coil 38 is energized in the circuit $$Tp\text{---}30\text{---}83\text{---}73\text{---}46\text{---}37\text{---}38\text{---}Tn \qquad (2)$$

Return relay RR cannot become energized because its coil circuit is first temporarily opened at 45 and then becomes permanently opened at interlock contact 44 of relay CR until the limit switch assembly LS operates or until the stop contact 47 is depressed.

Contact 40 of relay CR opens the coil circuit of brake relay BR so that the suicide field winding 6 is disconnected. Contacts 39 and 41 of relay CR close, through the cut rheostat 23, the pattern field circuit for coils 10:

$$Tp\text{---}39\text{---}16\text{---}19\text{---}10\text{---}21\text{---}23\text{---}41\text{---}Tn \qquad (3)$$

The pattern field coils 10 are now excited from the constant voltage terminals in accordance with the selected setting of the cut rheostat 23.

The pattern field excitation is effective on all four field poles of the generator R and produces a balanced four-pole flux component. The signal field windings 11 receive immediately a relative strong excitation which causes the forcing field windings (C1 to C4 and D1 to D4) of generator R to impose a strong forcing effect on the output voltage of generator R in a sense cumulative to that of the pattern field excitation. The initially strong excitation of the signal field windings 11 occurs in the signal field circuit:

$$Tp\text{---}39\text{---}16\text{---}14\text{---}15\text{---}13\text{---}11\text{---}21\text{---}23\text{---}41\text{---}Tn \qquad (4)$$

As mentioned, this signal field circuit includes two voltage sources in series opposition, namely, the voltage source Tp—Tn which provides a first component signal voltage, and the resistor 14 which impresses a voltage drop $E_1$ (second component signal voltage) in proportion to the output voltage of generator G. Since the generator voltage is at first zero, the voltage drop $E_1$ is likewise initially zero and this accounts for the fact the signal field coils 11 are at first strongly excited by the unopposed voltage from the terminals Tp and Tn. This initial field excitation is determined by the setting of cut rheostat 23 which forms part of the signal field circuit (4).

As the regulating generator R builds up in voltage and imposes a correspondingly increasing excitation on the main field winding 4 of the main generator G, the voltage across the armature 1 of motor M builds up accordingly and so does the voltage drop $E_1$ across resistor 14. Since this voltage drop (second component signal voltage) opposes the first component signal voltage resulting from terminals $Tn$ and $Tp$, the resultant signal excitation decreases accordingly. At the moment when the second component voltage $E_1$ reaches a value which balances the first component voltage relative to its effect on the signal field coils 11, these field coils receive zero excitation. Hence, the motor will now run at the speed determined by the pattern field excitation selected at rheostat 23. During steady-state performance, the field coils 12 and the signal field coils 11 regulate the field excitation with the result of maintaining motor M at the desired constant speed. That is, if, for instance, the motor runs faster than desired, the voltage drop $E_1$ increases beyond the balance value and causes the signal field windings 11 to act differentially on the resultant effect of the pattern field coils and IR drop field coils, thus causing the forcing coils between brushes B1 and B3 to impose a voltage-reducing forcing effect on the regulating generator, which, in turn, reduces the main generator field excitation and hence the voltage and speed of motor M to the proper value. Conversely, if the motor M runs too slow, the signal field coils S1 are energized in the opposite sense and then act cumulatively with respect to windings 10 and 12 so as to increase the motor voltage until the motor runs at the correct speed.

When the voltage across motor armature 1 and, hence, the motor speed exceed a given value, relay TR is sufficiently energized to pick up. The function then performed by relay TR will be explained in a later place. At a given higher value of motor voltage or motor speed, the coil 54 of field relay FR is sufficiently energized, in the circuit:

$$1—54—43—64—1 \qquad (5)$$

to open the contact 53. The motor field winding 2 receives weakened excitation, because now the rheostat 49 is inserted in series with the resistor 51 in the motor field circuit. The motor is then set for operation at maximum speed. The relay FR is preferably spring-biased and the spring is so adjusted that this relay picks up at approximately 60% rated generator voltage. The coil 54 of field relay FR is also under control by the contacts 64 and 65 of the limit switch assembly LS.

When the dog 67, during the above-described cut stroke, reaches the lever 66 of the limit switch assembly LS, contacts 64 and 65 are opened. The contact 64 opens the coil circuit (5) for field relay FR so that the motor speed is reduced due to strengthened excitation of its field winding 2. When thereafter the lever 74 is actuated, contact 73 opens the coil circuit (2) of relay CR. Relay CR drops out. The pattern field circuit (3) is opened at contacts 39 and 41 of relay CR so that the motor decelerates. Return relay RR picks up because its coil 31 is energized at contact 44 in the circuit $$Tp—29—69—45—44—31—Tn \qquad (6)$$

The pattern field circuit is now impressed by constant voltage of reversed polarity, through the return rheostat 22, in the circuit $$Tn—32—16—19—10—21—22—34—Tp \qquad (3a)$$

At the same time, the signal field circuit (4) is modified by the opening of contacts 39 and 41 in relay CR and the closing of contacts 32 and 34 in relay RR and now extends as follows:

$$Tn—32—16—14—15—13—11—21—22—34—Tp \qquad (4a)$$

As a result, the first component signal voltage derived from terminals $Tp$ and $Tn$ is also reversed. At this instant, the generator voltage is still in the cut direction so that now the second component signal voltage $E_1$ acts cumulatively with respect to the first component signal field voltage. Consequently, the signal field windings 11 receive highly increased excitation of a polarity opposite to that previously effective. Accordingly, the forcing coils between brushes B1 and B3 of generator R are under highly amplified excitation and force the output voltage of generator R to decrease rapidly and to build up in the reverse direction. Since the field excitation of generator G behaves in the same manner, the voltage applied to the motor armature 1 is rapidly forced down and reversed. This causes the motor to regeneratively brake to zero speed and to accelerate in the return direction until it reaches the speed selected by the return rheostat 22.

At the moment of motor reversal, the component signal voltage $E_1$ passes through zero and reverses its polarity so that it commences to act differentially as regards the reversal of the first component signal voltage. When the motor speed reaches the value adjusted at rheostat 22, the two component signal voltages are again balanced so that the resultant excitation of the signal coils 11 is zero. From then on, the system is operative to regulate the motor for constant speed in the same manner as described in the foregoing.

It will be remembeed that the elements of the limit switch arrangement LS return to the illustrated normal positions as soon as the return stroke is started and the dog 67 out of engagement with the levers 74 and 66. Consequently, at the beginning of the return stroke the coil circuit of field relay FR is reclosed through contacts 36 and 65 of the limit switch assembly. Therefore, when the motor, during the accelerating period, exceeds the speed value at which relay FR again picks up, the motor field is again weakened to permit obtaining maximum speed.

Near the end of the return stroke, dog 68 actuates the lever 66. As a result, contact 65 is opened so that the field relay FR drops out and strengthens the motor field thereby retarding the motor. Shortly thereafter, dog 68 engages the lever 71 thus closing contact 70 and opening contact 69. Return relay RR now drops out due to the opening of its coil circuit (6) at contact 69. Cut relay CR picks up because its coil circuit (2) is now reclosed at contact 37 of relay RR. Consequently, the cut stroke is repeated as described above and the reciprocating operation continues until the stop control contact 47 is opened by the operator.

The opening of stop control contact 47 has the effect of deenergizing coil 24 so that the main relay MR drops out and causes the relays CR and RR to also drop out. For instance, if the motor is operating in the cut direction when the stop contact is opened, the deenergization of the main relay MR causes the cut relay CR to drop out and to deenergize the pattern field circuit (3). If the planer is in the middle of its stroke, the motor brakes to rest since the signal field coils 11 remain excited in the correct direction to force the voltage of generator R and, consequently, the voltage of main generator G towards zero. At the predetermined low generator voltage, relay TR drops out and, by closing its contact 57, energizes the brake relay BR. Relay BR closes contact 55 and energizes the suicide field winding 6 to eliminate the resultant voltage of generator G in order to prevent the motor M from creeping.

It will be noted that under these conditions the braking effect will not be as strong as when the limit switch assembly LS is operated at the end of the cut stroke. Hence, should the stop contact 47 be operated just prior to the operation of the cut limit switch, the table could drift beyond the normal end of the cut stroke and, if the machine were cutting against a shoulder on the workpiece, damage might result to the planer or workpiece. Such detrimental effects, however, are prevented by a temporary reversal of field excitation in generator R when the stop contact 47 is operated at a time near the end of a stroke. This reversal is obtained by virtue of the devices and circuit connections described presently.

Referring again to the condition prevailing when the stop contact 47 is opened by the operator while the machine is executing a cut stroke, it will be remembered that relays MR and CR drop out. At the same time, however, the coil 31 of return relay RR becomes energized through the contact 59 of relay TR in the circuit.

$$Tp—59—72—69—45—44—31—Tn \quad (7)$$

Relay RR now establishes the reversed pattern field circuit (3a) and the modified signal field circuit (4a) so that the pattern field excitation and the first component signal voltage reverse its polarity. In this moment, the two component signal voltages have the same direction so that a highly increased signal excitation is effective, in addition to the reversed pattern field, to cause the forcing coils between brushes B1 and B3 to reduce the output voltage of generator R and hence the voltage of generator G in substantially the same manner as if the stop control lever 78 of the limit switch assembly LS had been operated. Relay TR drops out when the generator voltage reaches a low value. Contact 57 of relay TR then closes the coil circuit of brake relay BR in order to energize the suicide field winding 6, and contact 59 of the relay TR interrupts the coil circuit (7) for relay RR and thus deenergizes the pattern field circuit (3a) and the signal field circuit (4a).

A similar sequence of operation occurs if the stop contact 47 is operated near the end of a return stroke except that the cut relay CR is energized through contact 59 of relay TR to temporarily apply a strong braking effect on the regulating generator R.

It will be understood by those skilled in the art that the invention is applicable to variable-voltage systems for control or drive purposes other than those specifically referred to in the foregoing, and that systems according to our invention permit being modified and altered in various respects, especially as regards the design and interconnection of the individual components, without departing from the objects of the invention and within its essential features as set forth in the claims annexed hereto.

We claim as our invention:

1. A variable-voltage system, comprising a variable-voltage load circuit, a generator disposed for controlling the voltage of said load circuit and having control field means, said control field means having a signal field circuit with circuit means for providing a first component signal voltage and condition-responsive means for providing a second component signal voltage dependent upon an electric condition of said load circuit, said circuit means and said condition-responsive means being rated so that said first and said second component voltages balance each other when said condition has a desired magnitude, relay means disposed in said field circuit and having two operating conditions, said relay means interconnecting said circuit means and said condition-responsive means voltage-differentially when in one condition of said conditions and voltage-cumulatively when in said other condition, first control means connected with said relay means for controlling said relay means to maintain said one condition in order to cause said signal field circuit to regulate said variable voltage, and second control means connected with said relay means and comprising time limit means for controlling said relay means to temporarily assume said other condition in order to forcibly reduce said variable voltage.

2. A variable-voltage system, comprising a variable-voltage load circuit, a generator disposed for controlling the voltage of said load circuit and having control field means, said control field means having a signal field circuit with circuit means for providing a first component signal voltage and condition-responsive means for providing a second component signal voltage dependent upon an electric condition of said load circuit, said circuit means and said condition-responsive means being rated so that said first and said second component voltages balance each other when said condition has a desired magnitude, relay means connected with said field circuit and having two operating conditions, said relay means inter-connecting said circuit means and said condition-responsive means voltage differentially when in one of said conditions and voltage-cumulatively when in said other condition, first control means connected with said relay means for controlling said relay means to maintain said one condition in order to cause said signal field circuit to regulate said variable voltage, a voltage-responsive relay connected to said load circuit, and second control means connected to said relay means and to said relay for causing said relay means to temporarily assume said other condition if and as long as, after actuation of said second control means, said voltage remaining above a value determined by said relay.

3. A variable-voltage drive, comprising a motor, a generator disposed for controlling the variable voltage applied to said motor and having a signal field circuit, said field circuit having circuit means for providing a first component signal voltage and condition-responsive means for providing a second component signal voltage dependent upon an operating condition of said motor, said circuit means and said condition-responsive means being rated so that said first and said second component voltages balance each other when said condition has a desired magnitude, relay means associated with said field circuit and having two operating conditions for interconnecting said circuit means and said condition-responsive means voltage-differentially when in one condition and voltage-cumulatively when in the other condition, first control means connected with said relay means for controlling said relay means to maintain said one condition to run said motor in a given direction, and second control means connected with said relay means and comprising time limit means for controlling said relay means to temporarily assume said other condition in order to brake said motor.

4. A variable-voltage drive, comprising a motor, a generator disposed for controlling the variable voltage applied to said motor and having a signal field circuit, said field circuit having circuit means for providing a first component signal voltage and condition-responsive means for providing a second component signal voltage dependent upon an operating condition of said motor, said circuit means and said condition-responsive means being rated so that said first and said second component voltages balance each other when said condition has a desired magnitude, relay means associated with said field circuit and having two operating conditions for interconnecting said circuit means and said condition-responsive means voltage-differentially when in one condition and voltage-cumulatively when in the other condition, first control means connected with said relay means for controlling said relay means to maintain said one condition to run said motor in a given direction, a voltage relay connected to said motor to be responsive to a given minimum of said variable voltage, and second control means connected to said relay means and to said voltage relay for causing said relay means to temporarily assume said other condition if and as long as, after actuation of said second control means, said voltage remains above said minimum.

5. A variable-voltage drive, comprising a motor, a generator disposed for controlling the variable voltage applied to said motor and having a pattern field winding and a signal field winding, a pattern field circuit which includes said pattern field winding and has a rheostat for applying adjustable excitation to said pattern field winding, a signal field circuit which includes said signal field winding and has circuit means for providing a first component signal voltage and condition-responsive means for providing a second component signal voltage dependent upon an operating condition of said motor, said circuit means and said condition-responsive means being rated and interconnected so that said first and second component voltages oppose and balance each other as regards their effects on said signal field winding when said condition has a derived magnitude, relay means associated with said field circuits for controlling said pattern field excitation and said first component voltage, start control means connected to said relay means for controlling said relay means to apply said pattern field excitation and said first component voltage with respective polarities tending to make said motor run in a given direction, and stop control means connected to said relay means for causing, when actuated, said relay means to temporarily reverse the polarities of said pattern field excitation and said first component voltage so that then said excitation and said first and second component voltages act cumulatively to brake said motor, said stop control means including a time limit device for removing said pattern field excitation and said first component voltage near the end of the braking period.

6. A variable-voltage drive, comprising a motor having an armature circuit, a generator disposed for controlling the variable voltage applied to said armature circuit and having a pattern field winding and a signal field winding, a pattern field circuit which includes said pattern field winding and has a rheostat for applying adjustable excitation to said pattern field winding, a signal field circuit which includes said signal field winding and has circuit means for providing a first component signal voltage and a resistor connected to said armature circuit for providing a second component signal voltage dependent upon said variable voltage and normally in opposition to said first signal voltage, relay means associated with said two field circuits and having two "on" conditions and an "off" condition for applying said pattern field excitation and said first component voltage with respective polarities intended to run the motor in a given direction when said relay means are in one of said "on" conditions while reversing said pattern field excitation and said first component voltage when in the other "on" condition, run control means connected to said relay means for placing said relay means in said one "on" condition, stop control means connected to said relay means for placing said relay means in said "off" condition, and a voltage-responsive relay connected to said armature circuit and associated with said stop control means for temporarily placing said relay means after actuation of said stop control means in said other "on" condition to reverse said first component voltage relative to said second component voltage if and as long as said variable voltage remains above a given value determined by said voltage-responsive relay.

7. An electric control system, comprising a variable-voltage load circuit, an amplifying plural-stage generator disposed for controlling said variable voltage and having a signal field circuit magnetically associated with the first amplifying stage and a pattern field circuit magnetically associated with a subsequent amplifying stage so that said variable voltage depends upon resultant effects of said two field circuits, said signal field circuit having circuit means for applying a first component signal voltage of normally constant magnitude and an impedance member associated with said load circuit to provide a second component signal voltage in dependence upon an electric condition of said circuit and normally opposed to said first signal voltage, relay means controllable to assume any one of three relay conditions and connected to said two field circuits for providing excitation to said pattern field circuit and applying said first component voltage when in one of said relay conditions while removing said excitation and said first component voltage when in a second one of said relay conditions and reversing the polarity of said first component voltage when in the third relay condition, control means connected with said relay means for placing said relay means in said first condition, stop control means including a condition-responsive relay connected to said load circuit and associated with said relay means for causing said relay means, in response to actuation of said stop control means, to temporarily assume said third condition and thereafter said second condition.

8. An electric drive system, comprising a motor having an armature circuit, a generator disposed for controlling the load voltage applied to said armature circuit and having a pattern field circuit and a signal field circuit, an impedance member connected to said armature circuit and disposed in said signal field circuit to impress on said signal field circuit a variable component signal voltage substantially proportional to said load voltage and of a polarity determined only by that of said load voltage, circuit means for providing pattern voltage for said pattern field circuit and for providing a normally constant component voltage for said signal field circuit, forward-control means disposed between said circuit means and said field circuits so as to apply, when actuated, said pattern voltage and said constant component signal voltage to said respective circuits with such respective voltage polarity that said pattern voltage as well as said constant component voltage tend to make said motor run in the forward direction while said two component signal voltages normally oppose each other for regulating the motor speed, and return control means disposed between said circuit means and said field circuits so as to apply, when actuated, said pattern voltage and said constant component signal voltage to said respective field circuits with reversed polarity to cause said motor to run and be speed-regulated in the return direction, said forward and return control means being mutually interlocked so that the actuation of either causes the other to become inactive, whereby said actuation has the effect, when said motor is running, to render the control effects of said variable component signal voltage temporarily cumulative to those of said constant component signal voltage and said pattern voltage during the regenerative portion of the motor reversing periods.

9. An electric drive system according to claim 8 comprising, in combination, a stop contact for rendering inactive the one control means active at a time, and a condition-responsive relay connected with said armature circuit to be controlled in response to a predetermined minimum voltage depending upon an electric condition of said armature circuit, said relay having circuit controlling means electrically associated with said stop contact and said two control means so as to temporarily actuate said other control means, after actuation of said stop contact, as long as said minimum voltage is exceeded.

10. An electric drive system, comprising a motor having an armature circuit, a main generator connected to said armature circuit for applying variable load voltage thereto and having a field winding, a regulating generator connected to said field winding for controlling said load voltage, an impedance member connected to said armature circuit and disposed in said signal field circuit to impress on said signal field circuit a variable component signal voltage substantially proportional to said load voltage and of a polarity determined only by that of said load voltage, circuit means for providing pattern voltage for said pattern field circuit and for providing a normally constant component voltage for said signal field circuit, two limit switch means associated with said motor for predetermining the motor travel in both running directions respectively, a forward-run relay controlled by one of said switch means and connected between said circuit means and said field circuits so as to apply, when said one switch means is actuated, said pattern voltage and said constant component signal voltage to said respective circuits with such respective voltage polarities that said pattern voltage as well as said constant component voltage tend to make said motor run in the forward direction while said two component signal voltages normally oppose each other for regulating the motor speed, and a return-run relay controlled by said other switch means and connected between said circuit means and said field circuits so as to apply, when actuated, said pattern voltage and said constant component signal voltage to said respective field circuits with reversed polarities to cause said motor to run and be speed-regulated in the return direction, said two relays being mutually interlocked so that the actuation of either causes the other to become inactive, whereby said actuation has the effect, when said motor is running, to render the control effects of said variable component signal voltage temporarily cumulative to those of said constant component signal voltage and said pattern voltage during the regenerative portion of the motor reversing periods.

11. An electric drive system according to claim 10 comprising, in combination, an operator-actuable stop contact for rendering inactive the one relay active at a time, and a voltage relay connected across said motor armature circuit and having circuit controlling means electrically associated with said stop contact and said two relays so as to temporarily control the other relay to apply said pattern voltage and said first component signal voltage with reversed polarities during the interval, following the actuation of said stop contact, in which the voltage of said armature circuit remains above a given minimum value.

12. An electric drive system according to claim 10, wherein said regulating generator is a four-pole generator of the amplifying plural-stage type whose first stage involves two field poles and whose last stage involves four field poles, said signal field circuit being magnetically associated with said two-pole first stage, and said pattern field circuit being magnetically associated with the four-pole last stage of said regulating generator.

GEORGE E. KING.
MARTIN H. FISHER.

REFERENCES CITED

The following references are of record in the file of this patent:

UNITED STATES PATENTS

| Number | Name | Date |
| --- | --- | --- |
| 2,334,179 | Edwards et al. | Nov. 16, 1943 |
| 2,361,212 | King | Oct. 24, 1944 |